United States Patent
Zhang (10) Patent No.: US 12,142,202 B2
(45) Date of Patent: Nov. 12, 2024

(54) DISPLAY BRIGHTNESS ADJUSTMENT METHOD AND RELATED APPARATUS

(71) Applicant: HUAWEI TECHNOLOGIES CO., LTD., Guangdong (CN)

(72) Inventor: Xiufeng Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/917,392

(22) PCT Filed: Apr. 6, 2021

(86) PCT No.: PCT/CN2021/085590
§ 371 (c)(1),
(2) Date: Oct. 6, 2022

(87) PCT Pub. No.: WO2021/204105
PCT Pub. Date: Oct. 14, 2021

(65) Prior Publication Data
US 2023/0154396 A1    May 18, 2023

(30) Foreign Application Priority Data
Apr. 8, 2020  (CN) .......................... 202010270705.0

(51) Int. Cl.
*G09G 3/3208*    (2016.01)

(52) U.S. Cl.
CPC ... *G09G 3/3208* (2013.01); *G09G 2320/0233* (2013.01); *G09G 2320/0626* (2013.01); *G09G 2330/023* (2013.01); *G09G 2354/00* (2013.01); *G09G 2360/144* (2013.01); *G09G 2360/16* (2013.01)

(58) Field of Classification Search
None
See application file for complete search history.

(56) References Cited

U.S. PATENT DOCUMENTS

2011/0227966 A1    9/2011  Mori
2011/0298843 A1*  12/2011  Hajjar .................. G09G 3/2003
                                                                         345/690

(Continued)

FOREIGN PATENT DOCUMENTS

CN    101102437 A    1/2008
CN    106297731 A    1/2017

(Continued)

*Primary Examiner* — Amr A Awad
*Assistant Examiner* — Donna V Bocar
(74) *Attorney, Agent, or Firm* — WOMBLE BOND DICKINSON (US) LLP (57) ABSTRACT

This application discloses a display brightness adjustment method, including: an electronic apparatus obtains a to-be-displayed image and calculates an average pixel level APL of the to-be-displayed image. The electronic apparatus determines, based on the third light adjustment curve, an actual display brightness value corresponding to the average pixel level of the to-be-displayed image. The electronic apparatus adjusts display brightness of the to-be-displayed image based on the actual display brightness value. In this way, impact exerted on contrast when brightness is turned down at a low APL can be ensured, and a high contrast effect of image brightness of an HDR display can be ensured.

20 Claims, 6 Drawing Sheets

(56) References Cited

U.S. PATENT DOCUMENTS

| | | | |
|---|---|---|---|
| 2014/0176625 A1* | 6/2014 | Yoon | G09G 3/3233 345/691 |
| 2015/0062187 A1* | 3/2015 | Park | G09G 3/3225 345/63 |
| 2015/0170560 A1 | 6/2015 | Lim | |
| 2017/0251244 A1 | 8/2017 | Kozuka et al. | |
| 2017/0272690 A1 | 9/2017 | Seifi et al. | |
| 2019/0035357 A1* | 1/2019 | Lim | G09G 3/3208 |
| 2021/0134217 A1* | 5/2021 | Park | G09G 3/3233 |

FOREIGN PATENT DOCUMENTS

| | | |
|---|---|---|
| CN | 107465961 A | 12/2017 |
| CN | 108847201 A | 11/2018 |
| CN | 110231926 A | 9/2019 |
| CN | 110867161 A | 3/2020 |
| JP | H1039199 A | 2/1998 |
| JP | 2007298693 A | 11/2007 |
| KR | 100708823 B1 | 4/2007 |
| KR | 20150037423 A | 4/2015 |
| KR | 20160035192 A | 3/2016 |
| KR | 20190006730 A | 1/2019 |

\* cited by examiner

DISPLAY BRIGHTNESS ADJUSTMENT METHOD AND RELATED APPARATUS

CROSS-REFERENCE TO RELATED APPLICATIONS

This application is a national stage of International Application No. PCT/CN2021/085590, filed on Apr. 6, 2021, which claims priority to Chinese Patent Application No. 202010270705.0, filed on Apr. 8, 2020. Both of the aforementioned applications are hereby incorporated by reference in their entireties.

TECHNICAL FIELD

This application relates to the field of display technologies, and in particular, to a display brightness adjustment method and a related apparatus.

BACKGROUND

Currently, with establishment of a high dynamic range (HDR) 10 standard, various HDR standards such as HDR 10, hybrid log-gamma (HLG), Dolby Vision, and HDR 10+ have been popularized and applied successively. An HDR display becomes a key characteristic of a display device such as a TV, a display, a tablet, or a mobile phone.

An important indicator of the HDR display is peak brightness, and maximum display peak brightness agreed in an international standard is 10000 nits (nit). However, limited by a factor such as a material, a screen manufacturing process, or power consumption of a power supply, a dynamic range of brightness of an actual program source of a screen is from 0 nits to 4000 nits. For example, peak brightness of an existing best liquid crystal display (LCD) television is approximately 4000 nits, peak brightness of an existing best organic light-emitting diode (OLED) television is approximately 1000 nits, and peak brightness of a display device such as a display, a tablet, a smartphone, or a mobile phone is approximately 1000 nits. To perfectly present image information, there is a stricter brightness requirement for black and white in the HDR standard. An OLED has a self-luminous characteristic, and does not require a backlight. Therefore, any smallest display unit may be individually lighted on an OLED screen. The OLED may be close to a pure black state when the OLED does not illuminate, but power consumption increases correspondingly as a quantity of lighted areas and brightness increase. To avoid too high power consumption, the OLED screen is configured with a corresponding peak lightness curve (PLC) before delivery, and peak brightness of a lighted display area is determined based on a different average pixel level (APL). For example, when the APL is 100%, peak brightness of a display may be approximately 200 nits. As the APL decreases, the peak brightness may gradually increase to approximately 1000 nits.

In the conventional technology, brightness of the display such as the OLED screen is adjusted based on a light adjustment curve obtained by multiplying the peak lightness curve and a brightness gain value set by a user. The brightness gain value is less than or equal to 1. Then, display brightness of the display is adjusted based on an APL in each frame of image and the light adjustment curve. In this way, the display brightness of the display is discounted at all different APLs, and display image contrast of an HDR video is greatly reduced. Consequently, a display effect of the HDR video becomes poor.

SUMMARY

This application provides a display brightness adjustment method and a related apparatus, to ensure low impact exerted on contrast when brightness is turned down at a low APL, and ensure a high contrast effect of image brightness of an HDR display.

According to a first aspect, this application provides a display brightness adjustment method, including: An electronic apparatus obtains a to-be-displayed image. The electronic apparatus calculates an average pixel level of the to-be-displayed image. When the average pixel level of the to-be-displayed image is less than a first average pixel level, the electronic apparatus determines, based on a peak lightness curve of a display, an actual display brightness value corresponding to the average pixel level of the to-be-displayed image. When the average pixel level of the to-be-displayed image is greater than a second average pixel level, the electronic apparatus determines, based on a first light adjustment curve, the actual display brightness value corresponding to the average pixel level of the to-be-displayed image. When the average pixel level of the to-be-displayed image is between the first average pixel level and the second average pixel level, the electronic apparatus determines, based on a second light adjustment curve, the actual display brightness value corresponding to the average pixel level of the to-be-displayed image. The peak lightness curve, the first light adjustment curve, and the second light adjustment curve are different from each other. The first average pixel level is less than the second average pixel level. The electronic apparatus adjusts display brightness of the to-be-displayed image based on the actual display brightness value.

According to the display brightness adjustment method provided in this application, when the APL of the to-be-displayed image is in a low-APL segment, the display can display the to-be-displayed image by using peak brightness corresponding to the APL as implementation display brightness. When the APL of the to-be-displayed image is in a high-APL segment, the display can display the to-be-displayed image by using, as the actual display brightness, a brightness value obtained by multiplying a brightness gain value and the peak brightness corresponding to the APL. When the APL of the to-be-displayed image is in a middle-APL segment, as the APL increases, display brightness of the display can transition from the peak brightness to the brightness value obtained by multiplying the peak brightness and the brightness gain value. In this way, impact exerted on image contrast when brightness is turned down at a low APL can be reduced, and a high contrast effect of image brightness of an HDR display can be improved. In addition, at a high APL, image display brightness is low, and irritation to an eye of a user is reduced.

In an embodiment, before the electronic apparatus obtains the to-be-displayed image, the method further includes: The electronic apparatus obtains a brightness gain value. The brightness gain value is less than or equal to 1. The electronic apparatus determines the first light adjustment curve based on the brightness gain value and the peak lightness curve.

In an embodiment, before the electronic apparatus obtains the to-be-displayed image, the method further includes: The electronic apparatus obtains a brightness gain value. The brightness gain value is less than or equal to 1. The electronic apparatus determines the second light adjustment curve based on the preset first average pixel level, the preset second average pixel level, the brightness gain value, and the peak lightness curve.

In an embodiment, that the electronic apparatus obtains a brightness gain value includes: The electronic apparatus receives a brightness adjustment value entered by a user. The electronic apparatus determines the brightness gain value based on the brightness adjustment value and a brightness adjustment range.

In an embodiment, that the electronic apparatus obtains a brightness gain value includes: The electronic apparatus detects ambient brightness. The electronic apparatus determines, based on a correspondence between ambient brightness and a brightness gain, a brightness gain value corresponding to the detected ambient brightness.

In an embodiment, that the electronic apparatus adjusts display brightness of the to-be-displayed image based on the actual display brightness value includes: The electronic apparatus determines a corresponding drive current value based on the actual display brightness value. The electronic apparatus adjusts an input drive current of the display based on the drive current value when displaying the to-be-displayed image.

In an embodiment, at a same average pixel level, a corresponding display brightness value on the first light adjustment curve is less than or equal to a corresponding peak brightness value on the peak lightness curve.

In an embodiment, a display brightness value on the second light adjustment curve is inversely correlated with the average pixel level. A display brightness value corresponding to the first average pixel level on the second light adjustment curve is the same as a peak brightness value corresponding to the first average pixel level on the peak lightness curve. A display brightness value corresponding to the second average pixel level on the second light adjustment curve is the same as a peak brightness value corresponding to the second average pixel level on the first light adjustment curve.

In an embodiment, the display is a self-luminous display. A type of the display includes an organic light-emitting diode OLED display, an active-matrix organic light-emitting diode AMOLED display, and a quantum dot light-emitting diode QLED display.

In an embodiment, a formula used by the electronic apparatus to determine the first light adjustment curve is:

$$Y(x)=Gain*PLC(x).$$

Herein, $Y(x)$ is a corresponding brightness value on the first light adjustment curve when the average pixel level of the to-be-displayed image is x; x is the average pixel level of the to-be-displayed image, and $0<x\leq1$; $PLC(x)$ is a corresponding peak brightness value on the peak lightness curve when the average pixel level of the to-be-displayed image is x; and Gain is the brightness gain value, where $0<Gain\leq1$.

In an embodiment, a formula used by the electronic apparatus to determine the second light adjustment curve is:

$$F(x)=alpha(x)*Gain*PLC(x)+(1-alpha(x))*PLC(x);$$
and $$alpha(x)=(x-x1)/(x2-x1).$$

Herein, $F(x)$ is a corresponding brightness value on the second light adjustment curve when the average pixel level of the to-be-displayed image is x; x is the average pixel level of the to-be-displayed image, $x1\leq x\leq x2$, and $x1<x2$; $PLC(x)$ is a corresponding brightness value on the peak lightness curve when the average pixel level of the to-be-displayed image is x; Gain is the brightness gain value, where $0<Gain\leq1$; $alpha(x)$ is a ratio of a difference between the average pixel level of the to-be-displayed image and the first average pixel level to a difference between the first average pixel level and the second average pixel level; and x1 is the preset first average pixel level, and x2 is the preset second average pixel level.

In an embodiment, the electronic apparatus may be a television.

According to a second aspect, this application provides a display brightness adjustment method, including: An electronic apparatus obtains a brightness gain value. The brightness gain value is less than or equal to 1. The electronic apparatus determines a third light adjustment curve based on the brightness gain value, a peak lightness curve of a display, a preset first average pixel level, and a preset second average pixel level. The electronic apparatus obtains a to-be-displayed image. The electronic apparatus calculates an average pixel level of the to-be-displayed image. The electronic apparatus determines, based on the third light adjustment curve, an actual display brightness value corresponding to the average pixel level of the to-be-displayed image. The electronic apparatus adjusts display brightness of the to-be-displayed image based on the actual display brightness value.

According to the display brightness adjustment method provided in this application, when the APL of the to-be-displayed image is in a low-APL segment, the display can display the to-be-displayed image by using peak brightness corresponding to the APL as implementation display brightness. When the APL of the to-be-displayed image is in a high-APL segment, the display can display the to-be-displayed image by using, as the actual display brightness, a brightness value obtained by multiplying the brightness gain value and the peak brightness corresponding to the APL. When the APL of the to-be-displayed image is in a middle-APL segment, as the APL increases, display brightness of the display can transition from the peak brightness to the brightness value obtained by multiplying the peak brightness and the brightness gain value. In this way, impact exerted on image contrast when brightness is turned down at a low APL can be reduced, and a high contrast effect of image brightness of an HDR display can be improved. In addition, at a high APL, image display brightness is low, and irritation to an eye of a user is reduced.

In an embodiment, that the electronic apparatus determines a third light adjustment curve based on the brightness gain value, a peak lightness curve of a display, a preset first average pixel level, and a preset second average pixel level includes: The electronic apparatus determines a first light adjustment curve based on the brightness gain value and the peak lightness curve. The electronic apparatus determines a second light adjustment curve based on the first average pixel level, the second average pixel level, the brightness gain value, and the peak lightness curve. The electronic apparatus determines the third light adjustment curve based on the first light adjustment curve, the second light adjustment curve, the first average pixel level, and the second average pixel level.

In an embodiment, that an electronic apparatus obtains a brightness gain value includes: The electronic apparatus receives a brightness adjustment value entered by a user. The electronic apparatus determines the brightness gain value based on the brightness adjustment value and a brightness adjustment range.

In an embodiment, that an electronic apparatus obtains a brightness gain value includes: The electronic apparatus detects ambient brightness. The electronic apparatus determines, based on a correspondence between ambient brightness and a brightness gain, a brightness gain value corresponding to the detected ambient brightness.

In an embodiment, that the electronic apparatus adjusts display brightness of the to-be-displayed image based on the actual display brightness value includes: The electronic apparatus determines a corresponding drive current value based on the actual display brightness value. The electronic apparatus adjusts an input drive current of the display based on the drive current value when displaying the to-be-displayed image.

In an embodiment, at a same average pixel level, a corresponding display brightness value on the first light adjustment curve is less than or equal to a corresponding peak brightness value on the peak lightness curve.

In an embodiment, a display brightness value on the second light adjustment curve is inversely correlated with the average pixel level. A display brightness value corresponding to the first average pixel level on the second light adjustment curve is the same as a peak brightness value corresponding to the first average pixel level on the peak lightness curve. A display brightness value corresponding to the second average pixel level on the second light adjustment curve is the same as a peak brightness value corresponding to the second average pixel level on the first light adjustment curve.

In an embodiment, the display is a self-luminous display. A type of the display includes an organic light-emitting diode OLED display, an active-matrix organic light-emitting diode AMOLED display, and a quantum dot light-emitting diode QLED display.

In an embodiment, a formula used by the electronic apparatus to determine the first light adjustment curve is:

$$Y(x)=Gain*PLC(x).$$

Herein, $Y(x)$ is a corresponding brightness value on the first light adjustment curve when the average pixel level of the to-be-displayed image is x; x is the average pixel level of the to-be-displayed image, and $0<x\leq1$; $PLC(x)$ is a corresponding peak brightness value on the peak lightness curve when the average pixel level of the to-be-displayed image is x; and Gain is the brightness gain value, where $0<Gain\leq1$.

In an embodiment, a formula used by the electronic apparatus to determine the second light adjustment curve is:

$$F(x)=alpha(x)*Gain*PLC(x)+(1-alpha(x))*PLC(x);$$
and $$alpha(x)=(x-x1)/(x2-x1).$$

Herein, $F(x)$ is a corresponding brightness value on the second light adjustment curve when the average pixel level of the to-be-displayed image is x; x is the average pixel level of the to-be-displayed image, $x1\leq x\leq x2$, and $x1<x2$; $PLC(x)$ is a corresponding brightness value on the peak lightness curve when the average pixel level of the to-be-displayed image is x; Gain is the brightness gain value, where $0<Gain\leq1$; $alpha(x)$ is a ratio of a difference between the average pixel level of the to-be-displayed image and the first average pixel level to a difference between the first average pixel level and the second average pixel level; and x1 is the preset first average pixel level, and x2 is the preset second average pixel level.

In an embodiment, a formula used by the electronic apparatus to determine the third light adjustment curve is:

$$L(x)=PLC(x), \text{ where } x<x1;$$

$$L(x)=F(x), \text{ where } x1\leq x\leq x2; \text{ and}$$

$$L(x)=Y(x), \text{ where } x>x2.$$

Herein, $L(x)$ is a corresponding brightness value on the third light adjustment curve when the average pixel level of the to-be-displayed image is x; $PLC(x)$ is a corresponding brightness value on the peak lightness curve when the average pixel level of the to-be-displayed image is x; $Y(x)$ is a corresponding brightness value on the first light adjustment curve when the average pixel level of the to-be-displayed image is x; $F(x)$ is a corresponding brightness value on the second light adjustment curve when the average pixel level of the to-be-displayed image is x; x is the average pixel level of the to-be-displayed image; and x1 is the preset first average pixel level, and x2 is the preset second average pixel level, where $x1<x2$.

In an embodiment, the electronic apparatus is a television.

According to a third aspect, this application provides a display apparatus, including one or more processors, a display, and one or more memories. The one or more memories, the display, and the one or more processors are coupled, the one or more memories are configured to store computer program code, the computer program code includes computer instructions, and when the one or more processors execute the computer instructions, the display apparatus is enabled to perform the display brightness adjustment method in any possible implementation of any one of the foregoing aspects.

In an embodiment, the display apparatus may be an application processor.

In an embodiment, the display apparatus may be a television.

According to a fourth aspect, this application provides a computer storage medium, including computer instructions. When the computer instructions run on a display device, the display device is enabled to perform the display brightness adjustment method in any possible implementation of any one of the foregoing aspects.

According to a fifth aspect, an embodiment of this application provides a computer program product. When the computer program product runs on a computer, the computer is enabled to perform the display brightness adjustment method in any possible implementation of any one of the foregoing aspects.

According to a sixth aspect, this application provides a display device, including one or more functional modules. The one or more functional modules are configured to perform the display device brightness adjustment method in any possible implementation of any one of the foregoing aspects.

DESCRIPTION OF EMBODIMENTS

The technical solutions according to embodiments of this application are clearly and completely described below with reference to the accompanying drawings. In descriptions of embodiments of this application, unless otherwise specified, "I" indicates an "or" meaning. For example, A/B may indicate A or B. In this application, "and/or" is merely an association relationship for describing associated objects, and represents that three relationships may exist. For example, A and/or B may represent the following three cases: Only A exists, both A and B exist, and only B exists. In addition, in the descriptions of embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

An embodiment of this application provides a display brightness adjustment method. In an electronic apparatus, when an APL of a to-be-displayed image is in a low-APL segment, a display can display the to-be-displayed image by using peak brightness corresponding to the APL as implementation display brightness. When the APL of the to-be-displayed image is in a high-APL segment, the display can display the to-be-displayed image by using, as the actual display brightness, a brightness value obtained by multiplying a brightness gain value and the peak brightness corresponding to the APL. When the APL of the to-be-displayed image is in a middle-APL segment, as the APL increases, display brightness of the display can transition from the peak brightness to the brightness value obtained by multiplying the peak brightness and the brightness gain value. In this way, impact exerted on image contrast when brightness is turned down at a low APL can be reduced, and a high contrast effect of image brightness of an HDR display can be improved. In addition, at a high APL, image display brightness is low, and irritation to an eye of a user is reduced.

In an embodiment of the application, the electronic apparatus may be a display device, a display apparatus, or the like. In the following embodiments of this application, that the electronic apparatus is a display device is used as an example to describe the display brightness adjustment method provided in an embodiment of the application.

The following describes a schematic diagram of a structure of a display device 100 according to an embodiment of the application.

Figure 1:
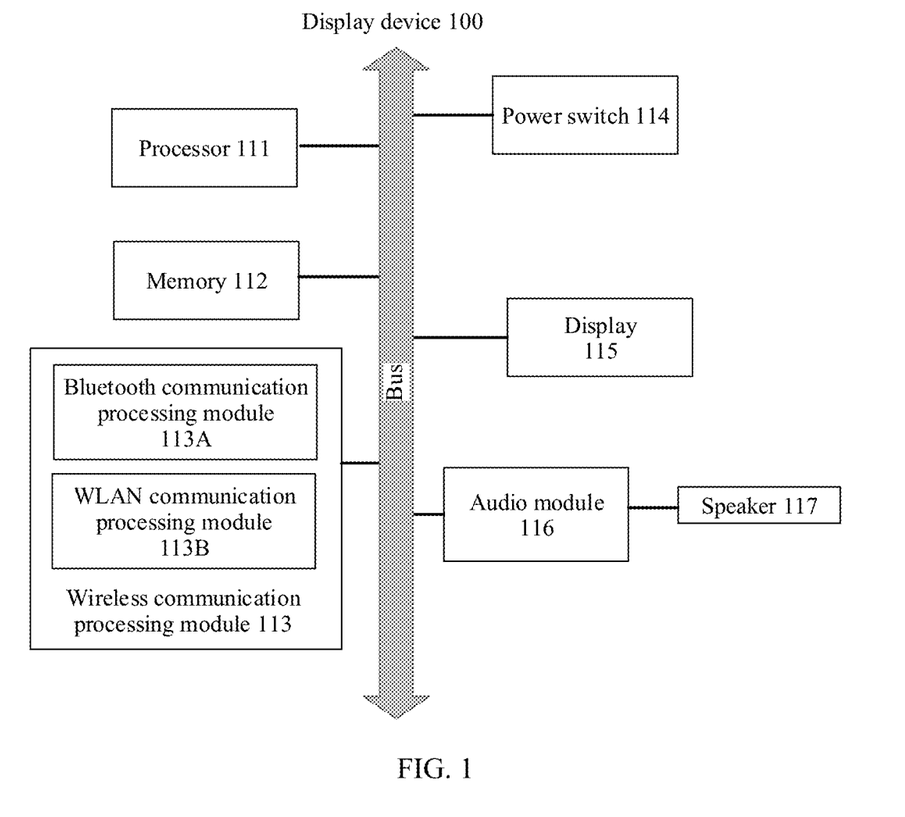
FIG. 1 is a schematic diagram of a structure of a display device according to an embodiment of this application.

As shown in FIG. 1, the display device 100 may include a processor 111, a memory 112, a wireless communication processing module 113, a power switch 114, a display 115, an audio module 116, and a speaker 117.

The processor 111 may include one or more processing units. For example, the processor 111 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the display device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces a waiting time of the processor 110, and improves system efficiency.

The memory 112 is coupled to the processor 111, to store various software programs and/or a plurality of sets of instructions. The memory 112 may be configured to store computer-executable program code. The executable program code includes instructions. The processor 111 implements various function applications and data processing of the display device 100 by running the instructions stored in the memory 112. The memory 112 may include a program storage area and a data storage area. The program storage area may store an operating system, an application required by at least one function (for example, a sound playing function or an image playing function), and the like. The data storage area may store data (for example, audio data or to-be-displayed image data) created in a process of using the display device 100. In addition, the memory 112 may include a high-speed random access memory, and may further include a nonvolatile memory, for example, at least one magnetic disk storage device, a flash memory, or a universal flash storage (UFS).

The wireless communications module 113 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the display device 100.

In some embodiments, the wireless communication processing module 113 may include a Bluetooth (BT) communication processing module 113A and a WLAN communication processing module 113B. One or more of the Bluetooth (BT) communication processing module 113A and the WLAN communication processing module 113B may listen to a signal transmitted by another device, for example, a probe request or a scan signal, and may send a response signal, for example, a probe response or a scan response, so that the another device may discover the display device 100, establish a wireless communication connection with the another device, and communicate with the another device by using one or more wireless communication technologies in Bluetooth or WLAN. The Bluetooth (BT) communication processing module 113A may provide one or more Bluetooth communication solutions including classic Bluetooth (BR/EDR) or Bluetooth low energy (BLE). The WLAN communication processing module 113B may include one or more WLAN communication solutions including Wi-Fi Direct, Wi-Fi LAN, or Wi-Fi SoftAP.

The power switch 114 may be configured to control a power supply to supply power to the display device 100. In some embodiments, the power switch 114 may be configured to control an external power supply to supply power to the display device 100.

In some embodiments, the display device 100 may further include a battery, a charging management module, and a power management module. The battery may be configured to provide power to the display device 100. The charging management module is configured to receive a charging input from a charger. The charger may be a wireless charger or a wired charger. In some embodiments of wired charging, the charging management module may receive a charging input of the wired charger through the USB interface 130. In some embodiments of wireless charging, the charging management module may receive a wireless charging input through a wireless charging coil of the display device 100. While charging the battery, the charging management module may further supply power to an electronic device by using the power management module. The power management module is configured to be connected to the battery, the charging management module, and the processor 111. The power management module receives an input from the battery and/or the charging management module, and supplies power to the processor 111, the memory 112, the display 115, the wireless communications module 113, or the like. The power management module may be further configured to monitor parameters such as a battery capacity, a battery cycle count, and a battery state of health (electric leakage and impedance). In some other embodiments, the power management module may alternatively be disposed in the processor 111. In some other embodiments, the power management module and the charging management module may alternatively be disposed in a same device.

The display 115 may be configured to display an image, a video, or the like. The display 115 includes a display panel. In an embodiment of the application, the display panel is a self-luminous display panel, for example, an organic light-emitting diode (OLED), an active-matrix organic light emitting diode or an active-matrix organic light emitting diode (AMOLED), or a quantum dot light-emitting diode (QLED). In some embodiments, the display device 100 may include one or N displays 194, where N is a positive integer greater than 1.

In an embodiment of the application, the display panel of the display device 100 may be described by using an OLED panel as an example.

Figure 2:
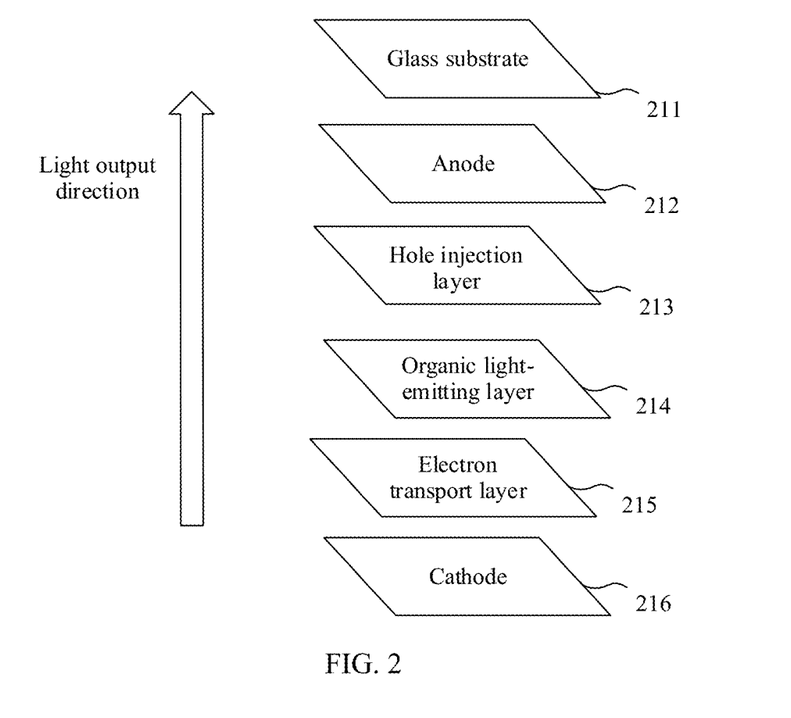
FIG. 2 is a schematic diagram of a structure of a display panel according to an embodiment of this application.

As shown in FIG. 2, the OLED panel includes a glass substrate 211, an anode 212, a hole injection layer 213, an organic light-emitting layer 214, an electron transport layer 215, and a cathode 216. The glass substrate 211 is transparent, and may be configured to support the entire OLED panel. The anode 212 is transparent, and when a current flows through the anode 212, the anode 212 may be used to eliminate an electron and increase an electron hole. The hole injection layer 213 is made of an organic material molecule, and is configured to transmit the electron hole from the anode 216. The organic light-emitting layer 214 is made of an organic material, and is configured to emit light. The electron transport layer 215 is made of an organic material molecule, and is configured to transmit an electron from the cathode 216. When a current passes through the cathode 216, the cathode 216 injects the electron into the electron transport layer 215. When there is a voltage between two ends, namely, the anode 212 and the cathode 216 due to a current drive, the electron hole generated by the anode 212 and the electron generated by the cathode 216 are combined at the organic light-emitting layer, to produce bright light. At the organic light-emitting layer 214, three primary colors of red green and blue (RGB) may be generated because of different types of organic material molecules, and constitute basic colors. In some embodiments, at the organic light-emitting layer 214, four colors of red green blue and white (RGBW) may be generated because of different types of organic material molecules, and constitute basic colors. Each light-emitting unit of the OLED panel can be lighted individually, and different colors of light are generated because of different organic material molecules at the organic light-emitting layer in the light-emitting unit.

Light-emitting brightness of the organic light-emitting layer 213 depends on performance of a light-emitting material and a magnitude of a current applied to the anode 212 and the cathode 216, and a greater current applied to the cathode 216 and the anode 212 leads to higher light-emitting brightness of the organic light-emitting layer 213. Therefore, each display pixel on the OLED panel may include red, green, and blue organic light-emitting units, and a display color of the display pixel may be adjusted by adjusting a proportion of values of injected currents of the red, green, and blue light-emitting units in the display pixel. Alternatively, each display pixel on the OLED panel may include red, green, blue, and white light-emitting units. A display color of the display pixel may be adjusted by adjusting a proportion of values of injected currents of the red, green, blue, and white light-emitting units in the display pixel. When the injected currents of the red, green, blue, and white light-emitting units in the display pixel are all adjusted to 0, the display pixel may be displayed as black. Image display brightness of the OLED panel may be adjusted by adjusting a drive current of the OLED panel.

The audio module 116 may be configured to convert a digital audio signal into an analog audio signal for output, and may be further configured to convert an analog audio input into a digital audio signal. The audio module 116 may be further configured to encode and decode an audio signal. In some embodiments, the audio module 116 may be disposed in the processor 111, or some function modules of the audio module 116 are disposed in the processor 111. The audio module 116 may transfer an audio signal to the wireless communications module 113 through a bus interface (for example, a UART interface), to implement a function of playing an audio signal by using a Bluetooth speaker.

The speaker 117 may be configured to convert the audio signal sent by the audio modules 116 into a sound signal.

In some embodiments, the display device 100 may further include a microphone, also referred to as a "microphone" or "microphone", configured to convert the sound signal into an electrical signal. When there is a voice control instruction, a user may make a sound through a human mouth, to enter a sound signal to the microphone.

In some embodiments, the display device 100 may further include a wired local area network (LAN) communication processing module, a high definition multimedia interface (HDMI) communication processing module, and a universal serial bus (USB) communication processing module. The wired LAN communication processing module may be configured to communicate with another device in one LAN through a wired LAN, and may be further configured to: be connected to a WAN through the wired LAN, and may communicate with a device in the WAN. The HDMI communication processing module may be configured to communicate with another device through an HDMI interface. For example, the HDMI communication processing module may receive, through the HDMI interface, data of an HDR video sent by a set top box. The USB communication processing module may be configured to communicate with another device through the USB interface.

Currently, a self-luminous screen such as the OLED may be close to a pure black state when the OLED does not illuminate, but power consumption increases correspondingly as a quantity of lighted areas and brightness increase. To avoid too high power consumption, the OLED screen is configured with a corresponding peak lightness curve (PLC) before delivery, and peak brightness of a lighted display area is determined based on a different average pixel level (APL). The average pixel level may be used to indicate a ratio of average pixel brightness of the to-be-displayed image to maximum pixel brightness of the to-be-displayed image.

Figure 3:
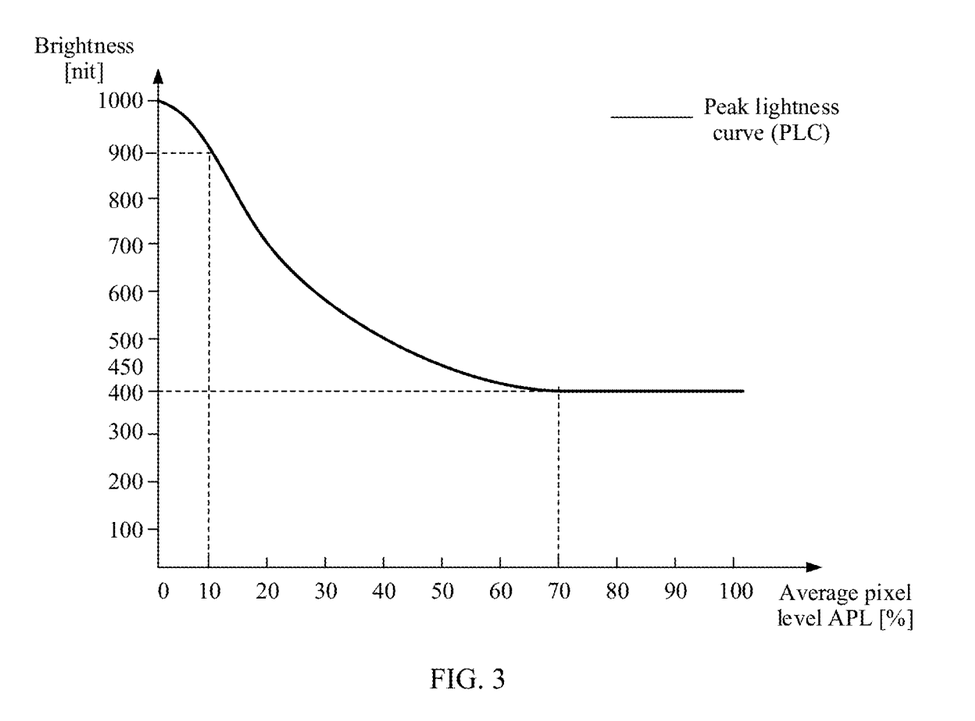
FIG. 3 is a schematic diagram of a peak lightness curve according to an embodiment of this application.

FIG. 3 shows an example of a peak lightness curve of a display. As shown in FIG. 3, a lateral axis of the peak lightness curve represents an average pixel level (APL), and a longitudinal axis represents display brightness of the display. When the APL is greater than or equal to 70%, peak brightness of the display is 400 nits. When the APL is equal to 10%, peak brightness of a display area is 900 nits. When the APL is less than or equal to 3%, the peak brightness of the display is close to 1000 nits. When the APL is greater than 10% and less than 70%, the peak brightness of the display decreases with an increase in the APL.

In the conventional technology, when actual display brightness of the display needs to be adjusted, a display device may adjust the actual display brightness based on a light adjustment curve obtained by multiplying the peak lightness curve and a brightness gain value set by a user. An adjustment method is shown in Formula (1):

$$P(x) = \text{Gain} * PLC(x) \qquad \text{Formula (1)}$$

In Formula (1), $P(x)$ is a brightness value of a to-be-displayed image displayed by the display when an average pixel level of the to-be-displayed image is x, x is the average pixel level (APL) of the to-be-displayed image, $0 < x \leq 1$, $PLC(x)$ is peak brightness of the display when the average pixel level of the to-be-displayed image is x, Gain is the brightness gain value set by the user, and $0 < \text{Gain} \leq 1$.

Figure 4:
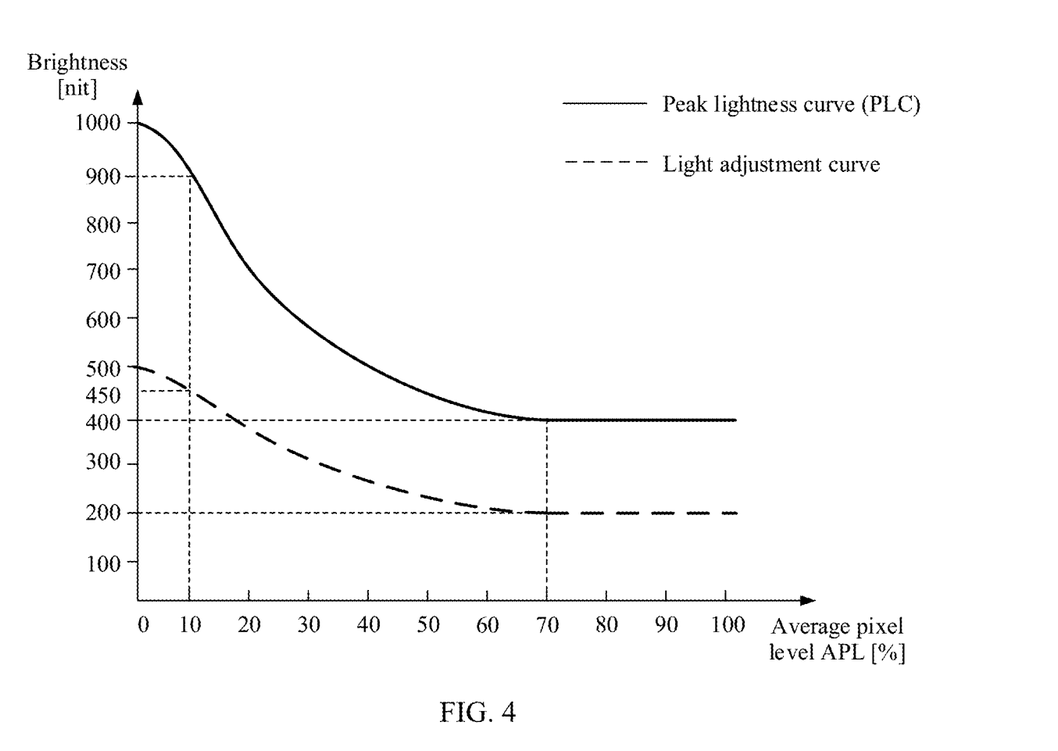
FIG. 4 is a schematic diagram of a light adjustment curve in a light adjustment method in the conventional technology.

FIG. 4 shows a light adjustment curve of a display. As shown in FIG. 4, a brightness gain value Gain set by a user may be 0.5. Therefore, at a same APL, all brightness values on the light adjustment curve are discounted to half of values on the peak lightness curve. For example, the brightness gain value Gain set by the user is 0.5. When an APL of a to-be-displayed image is 10%, a peak brightness value of the display is 900 nits, and a brightness value of a to-be-displayed image displayed by the display is 450 nits. When the APL of the to-be-displayed image is 70%, the peak brightness value of the display is 400 nits, and the brightness value of the to-be-displayed image displayed by the display is 200 nits.

It can be learned from the foregoing content that, in the conventional technology, brightness of the display is adjusted based on a light adjustment curve that is of an actual display brightness and that is obtained by directly multiplying the peak curve and the brightness gain value set by the user. Then, display brightness existing when the display displays the to-be-displayed image is adjusted based on the APL of the to-be-displayed image and the curve of the actual display brightness. In this way, display brightness of the display is discounted at all different APLs, and image contrast is reduced. Consequently, an HDR video playing effect is reduced.

Therefore, for the foregoing problem, an embodiment of this application provides a display brightness adjustment method. When an APL of a to-be-displayed image is in a low-APL segment, a display can display the to-be-displayed image by using peak brightness corresponding to the APL as implementation display brightness. When the APL of the to-be-displayed image is in a high-APL segment, the display can display the to-be-displayed image by using, as the actual display brightness, a brightness value obtained by multiplying a brightness gain value and the peak brightness corresponding to the APL. When the APL of the to-be-displayed image is in a middle-APL segment, as the APL increases, display brightness of the display can transition from the peak brightness to the brightness value obtained by multiplying the peak brightness and the brightness gain value. In this way, impact exerted on image contrast when brightness is turned down at a low APL can be reduced, and a high contrast effect of image brightness of an HDR display can be improved. In addition, at a high APL, image display brightness is low, and irritation to an eye of a user is reduced.

The following describes a display brightness adjustment method provided in an embodiment of this application.

Figure 5:
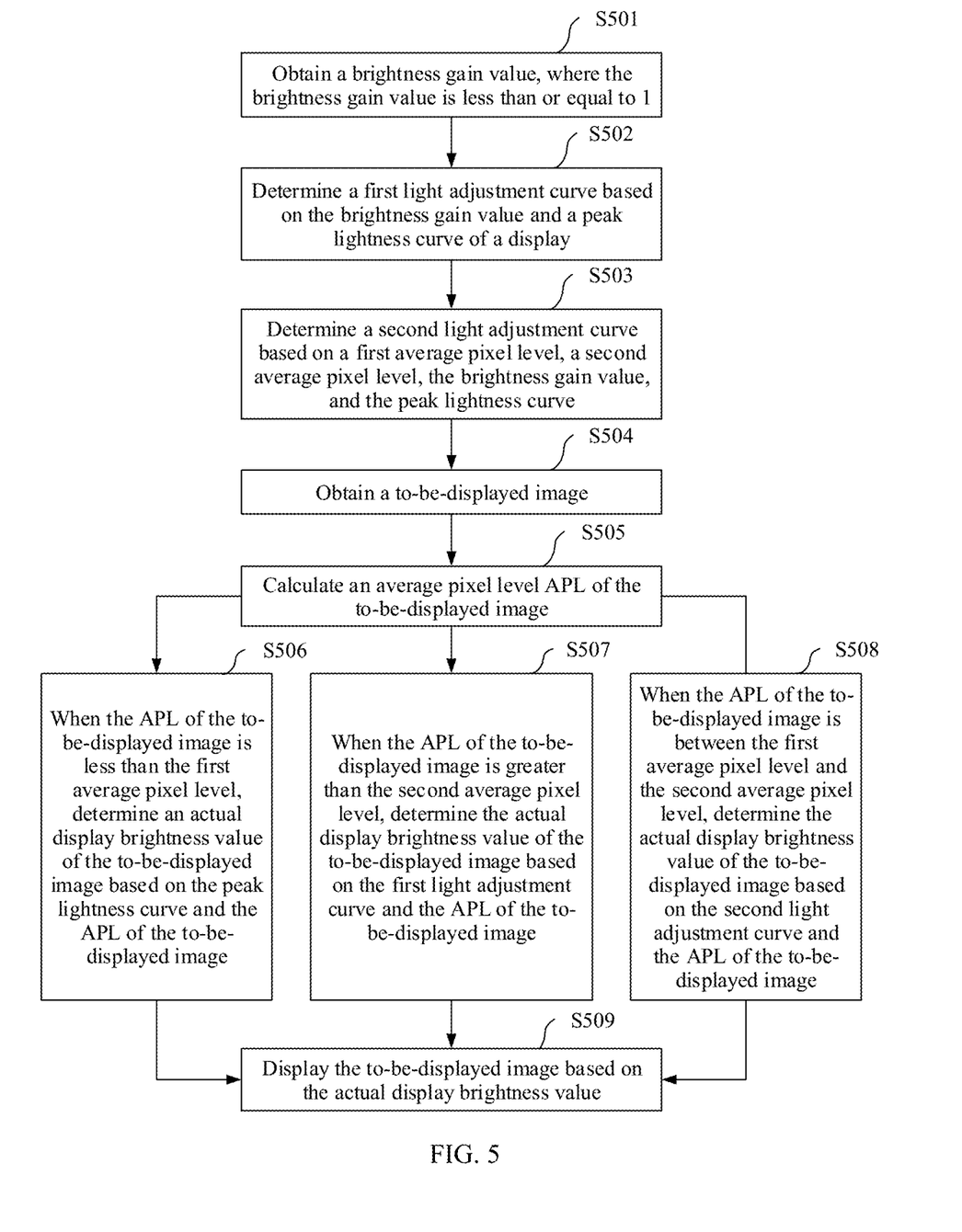
FIG. 5 is a schematic flowchart of a display brightness adjustment method according to an embodiment of this application.

FIG. 5 is an example schematic diagram of a display brightness adjustment method according to an embodiment of this application. As shown in FIG. 5, the method includes the following operations.

S501: A display device obtains a brightness gain value, where the brightness gain value is a non-negative number less than or equal to 1.

The brightness gain value may be set by a user.

For example, the display device may display a brightness adjustment bar, and a slider may be displayed on the brightness adjustment bar. The display device may receive a slide operation performed by the user on the slider. In response to the slide operation, the display device may determine the brightness gain value based on a location of the slider on the brightness adjustment bar and a length of the brightness adjustment bar. The display device may use, as the brightness gain value, a ratio of a distance from the location of the slider on the brightness adjustment bar to a first endpoint (for example, a leftmost end) of the brightness adjustment bar to the length of the brightness adjustment bar. For example, after the user slides the slider, the slider is located at a middle location of the brightness adjustment bar, and the display device may determine that the brightness gain value is 0.5.

For another example, the display device may receive a brightness adjustment value entered by the user, and the display device may determine the brightness gain value based on the brightness adjustment value entered by the user and a length of a brightness adjustment range. The brightness gain value is a ratio of the brightness adjustment value to the length of the brightness adjustment range. For example, if the brightness adjustment value entered by the user is 50, and the brightness adjustment range is from 0 to 100, in other words, the length of the brightness adjustment range is 100, the brightness gain value is 0.5.

In an embodiment, the display device may further determine, based on detected ambient brightness, a brightness gain value corresponding to the detected ambient brightness based on a correspondence between ambient brightness and a brightness gain value. The display device may adjust brightness of a display based on the brightness gain value corresponding to the detected ambient brightness. A brighter environment in which the display device is located leads to a greater brightness gain value used for the display device. For example, when the ambient brightness detected by the display device is 1000 luxes (lux), the display device determines, based on the correspondence between ambient brightness and a brightness gain value, that a brightness gain value corresponding to the ambient brightness of 1000 luxes is 0.8. The display device determines, based on the correspondence between ambient brightness and a brightness gain value, that a brightness gain value corresponding to the ambient brightness of 500 luxes is 0.4.

S502: The display device determines a first light adjustment curve based on the brightness gain value and a peak lightness curve of the display.

The peak lightness curve is stored in the display device before the display device is delivered from a factory. At a same APL, a display brightness value on the first light adjustment curve is less than or equal to a peak brightness value on the peak curve.

The display device may multiply the brightness gain value and peak brightness values corresponding to all APLs on the peak lightness curve, to obtain the first light adjustment curve. A formula for calculating the first light adjustment curve may be as follows:

$$Y(x) = \text{Gain} * PLC(x) \qquad \text{Formula (2)}$$

As shown in Formula (2), Y(x) is a corresponding brightness value on the first light adjustment curve when an average pixel level of a to-be-displayed image is x; x is the average pixel level of the to-be-displayed image, and $0 < x \leq 1$; PLC(x) is a peak brightness value of the display when the average pixel level of the to-be-displayed image is x; and Gain is the brightness gain value, where $0 < \text{Gain} \leq 1$.

Figure 6:
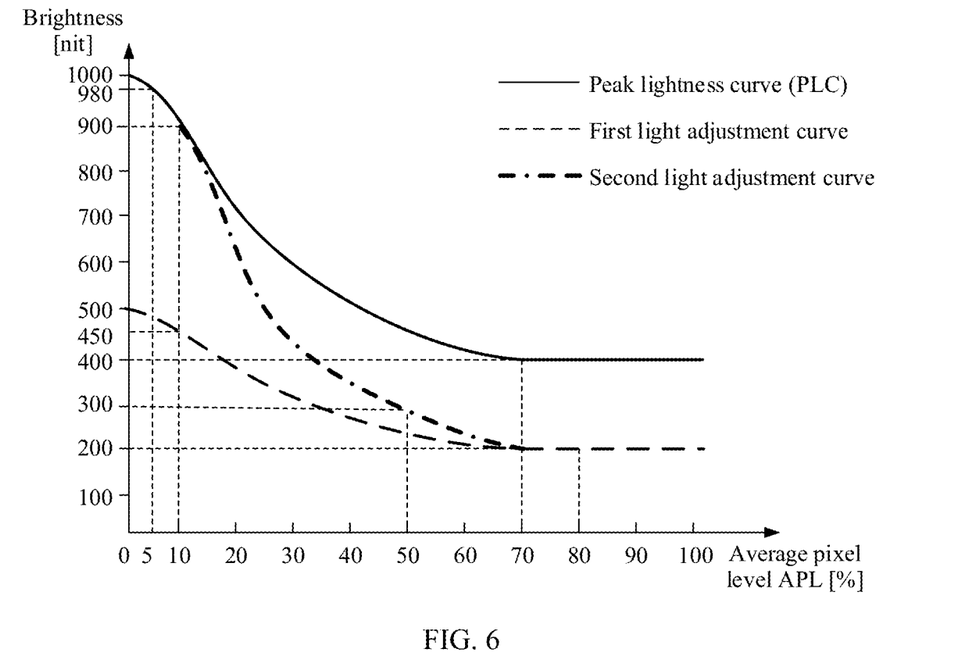
FIG. 6 is a schematic diagram of a light adjustment curve in a display brightness adjustment method according to an embodiment of this application.

For example, as shown in FIG. 6, when the brightness gain value is 0.5, the display brightness value on the first light adjustment curve is half of the peak brightness value on the peak curve at any APL. For example, when the APL is 10%, the peak brightness value on the peak lightness curve is 900 nits, and the display brightness value on the first light adjustment curve is 450 nits. When the APL is 70%, the peak brightness value on the peak lightness curve is 400 nits, and the display brightness value on the first light adjustment curve is 200 nits. The example is merely used to explain this application, and shall not constitute a limitation.

S503: The display device determines a second light adjustment curve based on a first average pixel level (APL), a second average pixel level (APL), the brightness gain value, and the peak lightness curve.

The first APL is less than the second APL. The first APL and the second APL are thresholds preset by the user or a system of the display device. A display brightness value on the second light adjustment curve is inversely correlated with the APL. In an embodiment, the display brightness value on the second light adjustment curve decreases as the APL increases. A display brightness value corresponding to the first APL on the second light adjustment curve is the same as a peak brightness value corresponding to the first APL on the peak lightness curve. A display brightness value corresponding to the second APL on the second light adjustment curve is the same as a peak brightness value corresponding to the first APL on the first light adjustment curve. When the APL of the to-be-displayed image is between the first APL and the second APL, display brightness corresponding to the APL of the to-be-displayed image on the second light adjustment curve is less than a peak brightness value corresponding to the APL of the to-be-displayed image on the peak lightness curve.

In an embodiment, the display device may determine the second light adjustment curve based on the first average pixel level (APL), the second average pixel level (APL), the brightness gain value, and the peak lightness curve and based on Formula (3) and Formula (4). Formula (3) and Formula (4) may be as follows:

$$F(x) = \text{alpha}(x) * \text{Gain} * PLC(x) + (1 - \text{alpha}(x)) * PLC(x) \qquad \text{Formula (3)}$$

$$\text{alpha}(x) = (x - x1)/(x2 - x1) \qquad \text{Formula (4)}$$

In Formula (3) and Formula (4), F(x) is a corresponding brightness value on the second light adjustment curve when the average pixel level of the to-be-displayed image is x; x is the average pixel level (APL) of the to-be-displayed image, $x1 \leq x \leq x2$, and $x1 < x2$; PLC(x) is a corresponding brightness value on the peak lightness curve when the average pixel level of the to-be-displayed image is x; Gain is the brightness gain value, where $0 < \text{Gain} \leq 1$; alpha(x) is a ratio of a difference between the average pixel level x of the to-be-displayed image and the first APL to a difference between the first APL and the second APL; and x1 is the first APL, and x2 is the second APL.

For example, as shown in FIG. 6, the first APL may be 10% (namely, 0.1), the second APL may be 70% (namely, 0.7), and the brightness gain value is 0.5. The display device may determine the second light adjustment curve based on the first APL, the second APL, the brightness gain value, and the peak lightness curve and based on Formula (3) and Formula (4). When the APL of the to-be-displayed image is 10% (namely, 0.1), the display brightness value on the second light adjustment curve is 900 nits. When the APL of the to-be-displayed image is 70% (namely, 0.7), the display brightness value on the second light adjustment curve is 200 nits. The foregoing example is merely used to explain this application. In an embodiment, the first APL and the second APL may have another value. This is not limited herein.

In an embodiment of the application, Formula (3) and Formula (4) are merely an embodiment, and should not constitute a limitation. In an embodiment, another formula or algorithm may be used to determine the second light adjustment curve based on the first average pixel level (APL), the second average pixel level (APL), the brightness gain value, and the peak lightness curve.

S504: The display device obtains the to-be-displayed image.

The display device may obtain the to-be-displayed image from to-be-displayed video data. The to-be-displayed image is each frame of image in the video data. For example, the display device is playing an HDR video. The display device may parse data of the HDR video to obtain a next frame of image, and use the next frame of image as the to-be-displayed image.

In an embodiment, the to-be-displayed image may alternatively be a picture selected by the user. For example, the display device may respond to a detected display operation performed by the user on an HDR picture, and the display device may obtain the HDR picture from the display device or a network, and use the HDR picture as the to-be-displayed image.

S505: The display device calculates the average pixel-level APL of the to-be-displayed image.

After obtaining the to-be-displayed image, the display device may convert the to-be-displayed image into image information (for example, RGB data). The image information includes a color value of each color display unit in each pixel when the display displays the to-be-displayed image. When all color values of all color display units in the pixel are 0, it indicates that the pixel is not lighted, and is displayed as pure black. The display device may calculate a ratio of the average pixel brightness of the to-be-displayed image to maximum pixel brightness (namely, the APL of the to-be-displayed image) based on the image information.

For example, the average pixel brightness of the to-be-displayed image may be 125, and the maximum pixel brightness may be 250. Therefore, the display device may calculate that the APL of the to-be-displayed image is 50%.

S506: When the APL of the to-be-displayed image is less than the first average pixel level, the display device determines an actual display brightness value of the to-be-displayed image based on the peak lightness curve and the APL of the to-be-displayed image.

For example, as shown in FIG. 6, for example, the first APL may be 10%, the second APL may be 70%, and the APL of the to-be-displayed image is 5%. Because the APL (for example, 5%) of the to-be-displayed image is less than the first APL (for example, 10%), the display device may determine, based on the peak lightness curve (PLC), that a corresponding peak brightness value is 980 nits when the APL of the to-be-displayed image is 5%, and use the peak brightness value 980 nits as the actual display brightness value of the to-be-displayed image. The example is merely used to explain this application, and shall not constitute a limitation.

S507: When the APL of the to-be-displayed image is greater than the second average pixel level, the display device determines the actual display brightness value of the to-be-displayed image based on the first light adjustment curve and the APL of the to-be-displayed image.

For example, as shown in FIG. 6, for example, the first APL may be 10%, the second APL may be 70%, and the APL of the to-be-displayed image is 80%. Because the APL (for example, 50%) of the to-be-displayed image is less than the second APL (for example, 70%), the display device may determine, based on the first light adjustment curve, that a corresponding brightness value is 200 nits when the APL of the to-be-displayed image is 80%, and use the brightness value 200 nits as the actual display brightness value of the to-be-displayed image. The example is merely used to explain this application, and shall not constitute a limitation.

S508: When the APL of the to-be-displayed image is between the first average pixel level and the second average pixel level, the display device determines the actual display brightness value of the to-be-displayed image based on a second curve.

For example, as shown in FIG. 6, for example, the first APL may be 10%, the second APL may be 70%, and the APL of the to-be-displayed image is 50%. Because the APL (for example, 50%) of the to-be-displayed image is between the first APL (for example, 10%) and the second APL (for example, 50%), the display device may determine, based on the second light adjustment curve, that a corresponding brightness value is 300 nits when the APL of the to-be-displayed image is 50%, and use the brightness value 300 nits as the actual display brightness value of the to-be-displayed image. The example is merely used to explain this application, and shall not constitute a limitation.

S509: The display device displays the to-be-displayed image based on the actual display brightness value.

After determining the actual display brightness value, the display device may determine a corresponding drive current value based on the actual display brightness value, and enter a drive current into the display based on the drive current value.

In an embodiment, the display device may determine a third light adjustment curve based on the brightness gain value, the peak lightness curve of the display, the preset first average pixel level, and the preset second average pixel level. First, the display device may determine the first light adjustment curve based on the brightness gain value and the peak lightness curve. Then, the display device determines the second light adjustment curve based on the first average pixel level, the second average pixel level, the brightness gain value, and the peak lightness curve. Next, the display device determines the third light adjustment curve based on the first light adjustment curve, the second light adjustment curve, the first average pixel level, and the second average pixel level. Then, after the display device calculates the average pixel level of the to-be-displayed image, the display device may determine the actual display brightness value based on the average pixel level of the to-be-displayed image and the third light adjustment curve.

The display device may determine the third light adjustment curve based on the first light adjustment curve, the second light adjustment curve, the first average pixel level, and the second average pixel level and based on the following formula:

$L(x)=PLC(x)$, where $x<x1$;

$L(x)=F(x)$, where $x1 \le x \le x2$; and $L(x)=Y(x)$, where $x>x2$.

When $x<x1$, $L(x)=PLC(x)$; when $x1 \le x \le x2$, $L(x)=F(x)$; and when $x>x2$, $L(x)=Y(x)$. $L(x)$ is a corresponding brightness value on the third light adjustment curve when the average pixel level of the to-be-displayed image is x, $PLC(x)$ is a corresponding brightness value on the peak lightness curve when the average pixel level of the to-be-displayed image is x, $Y(x)$ is a corresponding brightness value on the first light adjustment curve when the average pixel level of the to-be-displayed image is x, $F(x)$ is a corresponding brightness value on the second light adjustment curve when the average pixel level of the to-be-displayed image is x, x is the average pixel level of the to-be-displayed image, x1 is the first average pixel level, x2 is the second average pixel level, and x1<x2.

According to the display brightness adjustment method provided in an embodiment of the application, when the APL of the to-be-displayed image is in a low-APL segment, the display can display the to-be-displayed image by using peak brightness corresponding to the APL as implementation display brightness. When the APL of the to-be-displayed image is in a high-APL segment, the display can display the to-be-displayed image by using, as the actual display brightness, a brightness value obtained by multiplying the brightness gain value and the peak brightness corresponding to the APL. When the APL of the to-be-displayed image is in a middle-APL segment, as the APL increases, display brightness of the display can transition from the peak brightness to the brightness value obtained by multiplying the peak brightness and the brightness gain value. In this way, impact exerted on image contrast when brightness is turned down at a low APL can be reduced, and a high contrast effect of image brightness of an HDR display can be improved. In addition, at a high APL, image display brightness is low, and irritation to an eye of the user is reduced.

In an embodiment, the display device may have a plurality of display modes (for example, a bright mode, a standard mode, and a soft mode), and different display modes correspond to different peak lightness curves. The display device may determine, based on a specified first display mode, a peak lightness curve corresponding to the first display mode, and determine the first light adjustment curve based on the peak lightness curve corresponding to the first display mode and the brightness gain value. When the APL of the to-be-displayed image is less than the first APL, the display device may determine the actual display brightness value of the to-be-displayed image based on the peak lightness curve corresponding to the first display mode and the APL of the to-be-displayed image. In this way, regardless of a display mode of the display device, the impact exerted on the image contrast when brightness is turned down at the low APL can be reduced, and the high contrast effect of the image brightness of the HDR display can be improved.

The following describes a display system provided in an embodiment of this application.

Figure 7:
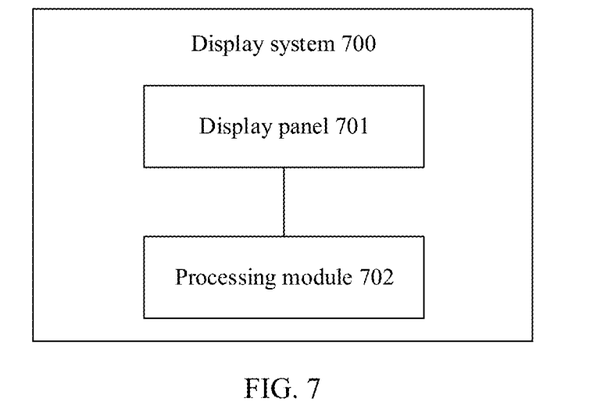
FIG. 7 is a schematic diagram of a display system according to an embodiment of this application.

FIG. 7 is a schematic diagram of a display system 700 according to an embodiment of this application. A display device 100 may include the display system 700.

As shown in FIG. 7, the display system 700 may include a display panel 701 and a processing module 702. The processing module 702 may include an application processor and a display driver chip. The display panel 701 may be a self-luminous display panel, for example, an OLED display panel, an AMOLED display panel, or a QLED display panel.

The processing module 702 may be configured to obtain a brightness gain value. The brightness gain value is a non-negative number less than or equal to 1.

The processing module 702 may be further configured to determine a first light adjustment curve based on the brightness gain value and a peak lightness curve of a display. The peak lightness curve is stored in the display device before the display device is delivered from a factory. At a same APL, a display brightness value on the first light adjustment curve is less than or equal to a peak brightness value on the peak curve.

The processing module 702 may be further configured to determine a second light adjustment curve based on a first average pixel level (APL), a second average pixel level (APL), the brightness gain value, and the peak lightness curve.

The first APL is less than the second APL. The first APL and the second APL are thresholds preset by a user or the system of the display device. A display brightness value on the second light adjustment curve is inversely correlated with an APL. In an embodiment, the display brightness value on the second light adjustment curve decreases as the APL increases. A display brightness value corresponding to the first APL on the second light adjustment curve is the same as a peak brightness value corresponding to the first APL on the peak lightness curve. A display brightness value corresponding to the second APL on the second light adjustment curve is the same as a peak brightness value corresponding to the first APL on the first light adjustment curve. When an APL of the to-be-displayed image is between the first APL and the second APL, display brightness corresponding to the APL of the to-be-displayed image on the second light adjustment curve is less than a peak brightness value corresponding to the APL of the to-be-displayed image on the peak lightness curve.

The processing module 702 may be further configured to obtain the to-be-displayed image.

The processing module 702 may be further configured to calculate the average pixel level APL of the to-be-displayed image.

The processing module 702 may be further configured to: when the APL of the to-be-displayed image is less than the first average pixel level, determine an actual display brightness value of the to-be-displayed image based on the peak lightness curve and the APL of the to-be-displayed image.

The processing module 702 may be further configured to: when the APL of the to-be-displayed image is greater than the second average pixel level, determine the actual display brightness value of the to-be-displayed image based on the first light adjustment curve and the APL of the to-be-displayed image.

The processing module 702 may be further configured to determine the actual display brightness value of the to-be-displayed image based on a second curve when the APL of the to-be-displayed image is between the first average pixel level and the second average pixel level.

The processing module 702 may be further configured to control the display panel 701 to display the to-be-displayed image based on the actual display brightness value.

In an embodiment, the processing module 702 includes the application processor and the display driver chip. The application processor may determine a third light adjustment curve based on the brightness gain value, the peak lightness curve of the display, the preset first average pixel level, and the preset second average pixel level. First, the application processor may determine the first light adjustment curve based on the brightness gain value and the peak lightness curve. Then, the application processor determines the second light adjustment curve based on the first average pixel level, the second average pixel level, the brightness gain value, and the peak lightness curve. Next, the application processor determines the third light adjustment curve based on the first light adjustment curve, the second light adjustment curve, the first average pixel level, and the second average pixel level. Then, after calculating the average pixel level of the to-be-displayed image, the display driver chip may determine the actual display brightness value based on the average pixel level of the to-be-displayed image and the third light adjustment curve sent by the application processor. After determining the actual display brightness value, the display driver chip may determine a corresponding drive current value based on the actual display brightness value, and enter a drive current into the display panel 701 based on the drive current value.

For content, refer to the method embodiment shown in FIG. 5. Details are not described herein again.

According to the display system 700 provided in an embodiment of the application, when the APL of the to-be-displayed image is in a low-APL segment, the display can display the to-be-displayed image by using peak brightness corresponding to the APL as implementation display brightness. When the APL of the to-be-displayed image is in a high-APL segment, the display can display the to-be-displayed image by using, as the actual display brightness, a brightness value obtained by multiplying the brightness gain value and the peak brightness corresponding to the APL. When the APL of the to-be-displayed image is in a middle-APL segment, as the APL increases, display brightness of the display can transition from the peak brightness to the brightness value obtained by multiplying the peak brightness and the brightness gain value. In this way, impact exerted on image contrast when brightness is turned down at a low APL can be reduced, and a high contrast effect of image brightness of an HDR display can be improved. In addition, at a high APL, image display brightness is low, and irritation to an eye of the user is reduced.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for adjusting display brightness, comprising:
   obtaining, by an electronic apparatus, an image to be displayed;
   calculating, by the electronic apparatus, an average pixel level of the image;
   when the average pixel level of the image is less than a preset first average pixel level, determining, by the electronic apparatus based on a peak lightness curve of a display, an actual display brightness value corresponding to the average pixel level of the image, wherein the image is displayed by using peak brightness when the average pixel level is less than the preset first average pixel level;
   when the average pixel level of the image is greater than a preset second average pixel level, determining, by the electronic apparatus based on a first light adjustment curve, the actual display brightness value corresponding to the average pixel level of the image, wherein the first light adjustment curve is determined based on a first formula:
   $Y(x)=Gain*PLC(x)$, wherein when the average pixel level of the image to be displayed is x, the $Y(x)$ is a corresponding brightness value on the first light adjustment curve; x is the average pixel level of the image to be displayed, and x is more than 0 and less than or equal to 1; PLC (x) is a corresponding peak brightness value on the peak lightness curve when the average pixel level of the image to be displayed is x; and the Gain is a brightness gain value, wherein the Gain is more than 0 and less than or equal to 1;
   when the average pixel level of the image is between the preset first average pixel level and the preset second average pixel level, determining, by the electronic apparatus based on a second light adjustment curve, the actual display brightness value corresponding to the average pixel level of the image, wherein as the average pixel level of the image increases, a brightness of the image transitions from the peak brightness to a brightness value obtained by multiplying the peak brightness and a brightness gain value corresponding to the average pixel level of the image, wherein when the average pixel level is greater than 70%, the peak brightness of the display is 200 nits, wherein when the average pixel level is greater than or equal to 10% and less than or equal to 70%, the peak brightness of the display decreases with an increase in the average pixel level, wherein the peak lightness curve, the first light adjustment curve, and the second light adjustment curve are different from each other, and wherein the preset first average pixel level is less than the preset second average pixel level; and
   indicating, by the electronic apparatus, to adjust display brightness of the image based on the actual display brightness value.

2. The method according to claim 1, wherein before obtaining the image, the method further comprises:
   obtaining, by the electronic apparatus, a brightness gain value less than or equal to 1; and
   determining, by the electronic apparatus, the first light adjustment curve based on the brightness gain value and the peak lightness curve.

3. The method according to claim 2, wherein obtaining the brightness gain value comprises:
   receiving, by the electronic apparatus, a brightness adjustment value entered by a user; and
   determining, by the electronic apparatus, the brightness gain value based on the brightness adjustment value and a brightness adjustment range.

4. The method according to claim 2, wherein obtaining the brightness gain value comprises:
   detecting, by the electronic apparatus, ambient brightness; and
   determining, by the electronic apparatus based on a correspondence between ambient brightness and a brightness gain, a brightness gain value corresponding to the detected ambient brightness.

5. The method according to claim 1, wherein before obtaining the image, the method further comprises:
   obtaining, by the electronic apparatus, a brightness gain value less than or equal to 1; and
   determining, by the electronic apparatus, the second light adjustment curve based on the preset first average pixel level, the preset second average pixel level, the brightness gain value, and the peak lightness curve.

6. The method according to claim 1, wherein indicating to adjust display brightness of the image based on the actual display brightness value comprises:
   determining, by the electronic apparatus, a corresponding drive current value based on the actual display brightness value; and
   indicating, by the electronic apparatus, to adjust an input drive current of the display based on the determined drive current value.

7. The method according to claim 1, wherein at a same average pixel level, a corresponding display brightness value on the first light adjustment curve is less than or equal to a corresponding peak brightness value on the peak lightness curve.

8. The method according to claim 1, wherein a display brightness value on the second light adjustment curve is inversely correlated with the average pixel level;
   wherein a display brightness value corresponding to the first average pixel level on the second light adjustment curve is the same as a peak brightness value corresponding to the first average pixel level on the peak lightness curve; and wherein a display brightness value corresponding to the second average pixel level on the second light adjustment curve is the same as a peak brightness value corresponding to the second average pixel level on the first light adjustment curve.

9. The method according to claim 1, wherein the electronic apparatus is an application processor.

10. A non-transitory computer-readable storage medium, comprising instructions, wherein when the instructions are run on a display device, the display device is enabled to perform the method according to claim 1.

11. A method for adjusting display brightness, comprising:
   obtaining, by an electronic apparatus, a brightness gain value, less than or equal to 1;
   determining, by the electronic apparatus, a third light adjustment curve based on a first light adjustment curve, the brightness gain value, a peak lightness curve of a display, a preset first average pixel level, and a preset second average pixel level;

obtaining, by the electronic apparatus, an image to be displayed;

calculating, by the electronic apparatus, an average pixel level of the image;

when an average pixel level of the image is greater than the preset second average pixel level, determining, by the electronic apparatus based on the first light adjustment curve, an actual display brightness value corresponding to the average pixel level of the image, wherein the first light adjustment curve is determined based on a first formula:

Y(x)=Gain*PLC(x), wherein when the average pixel level of the image to be displayed is x, the Y (x) is a corresponding brightness value on the first light adjustment curve; x is the average pixel level of the image to be displayed, and x is more than 0 and less than or equal to 1; PLC (x) is a corresponding peak brightness value on the peak lightness curve when the average pixel level of the image to be displayed is x; and the Gain is the brightness gain value, wherein the Gain is more than 0 and less than or equal to 1;

determining, by the electronic apparatus based on the third light adjustment curve, the actual display brightness value corresponding to the average pixel level of the image, wherein when the average pixel level is less than the preset first average pixel level, the image is displayed by using peak brightness, wherein when the average pixel level of the image is between the preset first average pixel level and the preset second average pixel level, as the average pixel level of the image increases, a brightness of the image transitions from the peak brightness to a brightness value obtained by multiplying the peak brightness and the brightness gain value corresponding to the average pixel level of the image, wherein when the average pixel level is greater than 70%, the peak brightness of the display is 200 nits, wherein when the average pixel level is greater than or equal to 10% and less than or equal to 70%, the peak brightness of the display decreases with an increase in the average pixel level; and indicating, by the electronic apparatus, to adjust display brightness of the image based on the actual display brightness value.

12. The method according to claim 11, wherein determining the third light adjustment curve based on the brightness gain value, the peak lightness curve of a display, the preset first average pixel level, and the preset second average pixel level comprises:

determining, by the electronic apparatus, a first light adjustment curve based on the brightness gain value and the peak lightness curve;

determining, by the electronic apparatus, a second light adjustment curve based on the preset first average pixel level, the preset second average pixel level, the brightness gain value, and the peak lightness curve; and determining, by the electronic apparatus, the third light adjustment curve based on the preset first light adjustment curve, the preset second light adjustment curve, the first average pixel level, and the second average pixel level.

13. The method according to claim 12, wherein at a same average pixel level, a corresponding display brightness value on the first light adjustment curve is less than or equal to a corresponding peak brightness value on the peak lightness curve.

14. The method according to claim 12, wherein a display brightness value on the second light adjustment curve is inversely correlated with the average pixel level;

wherein a display brightness value corresponding to the preset first average pixel level on the second light adjustment curve is the same as a peak brightness value corresponding to the preset first average pixel level on the peak lightness curve; and wherein a display brightness value corresponding to the preset second average pixel level on the second light adjustment curve is the same as a peak brightness value corresponding to the preset second average pixel level on the first light adjustment curve.

15. The method according to claim 11, wherein obtaining the brightness gain value comprises:

receiving, by the electronic apparatus, a brightness adjustment value entered by a user; and determining, by the electronic apparatus, the brightness gain value based on the brightness adjustment value and a brightness adjustment range.

16. The method according to claim 11, wherein obtaining the brightness gain value comprises:

detecting, by the electronic apparatus, ambient brightness; and determining, by the electronic apparatus based on a correspondence between ambient brightness and a brightness gain, a brightness gain value corresponding to the detected ambient brightness.

17. The method according to claim 11, wherein indicating to adjust display brightness of the image based on the actual display brightness value comprises:

determining, by the electronic apparatus, a corresponding drive current value based on the actual display brightness value; and indicating, by the electronic apparatus, to adjust an input drive current of the display based on the determined drive current value.

18. A display apparatus, comprising one or more processors, a display, and one or more memories coupled to each other, wherein the one or more memories are configured to store computer program code comprising computer instructions, which when executed by the one or more processors, cause the display apparatus to perform operations, the operations comprising:

obtaining an image to be displayed;

calculating an average pixel level of the image;

when the average pixel level of the image is less than a preset first average pixel level, determining, based on a peak lightness curve of a display, an actual display brightness value corresponding to the average pixel level of the image, wherein the image is displayed by using peak brightness when the average pixel level is less than the preset first average pixel level;

when the average pixel level of the image is greater than a preset second average pixel level, determining, based on a first light adjustment curve, the actual display brightness value corresponding to the average pixel level of the image, wherein the first light adjustment curve is determined based on a first formula:

Y(x)=Gain*PLC(x), wherein when the average pixel level of the image to be displayed is x, the Y (x) is a corresponding brightness value on the first light adjustment curve; x is the average pixel level of the image to be displayed, and x is more than 0 and less than or equal to 1; PLC (x) is a corresponding peak brightness value on the peak lightness curve when the average pixel level of the image to be displayed is x; and the Gain is a brightness gain value, wherein the Gain is more than 0 and less than or equal to 1;

when the average pixel level of the image is between the preset first average pixel level and the preset second average pixel level, determining, based on a second light adjustment curve, the actual display brightness value corresponding to the average pixel level of the image, wherein as the average pixel level of the image increases, a brightness of the image transitions from the peak brightness to a brightness value obtained by multiplying the peak brightness and a brightness gain value corresponding to the average pixel level of the image, wherein when the average pixel level is greater than 70%, the peak brightness of the display is 200 nits, wherein when the average pixel level is greater than or equal to 10% and less than or equal to 70%, the peak brightness of the display decreases with an increase in the average pixel level, wherein the peak lightness curve, the first light adjustment curve, and the second light adjustment curve are different from each other, and wherein the preset first average pixel level is less than the preset second average pixel level; and indicating to adjust display brightness of the image based on the actual display brightness value.

19. The display apparatus according to claim 18, wherein the display apparatus is an application processor.

20. The display apparatus according to claim 18, wherein the display apparatus is a television.

* * * * *